(12) United States Patent
Quinta Cortinas

(10) Patent No.: US 11,553,698 B2
(45) Date of Patent: Jan. 17, 2023

(54) SYSTEM FOR FATTENING MOLLUSCS

(71) Applicant: Andres Quinta Cortinas, Pontevedra (ES)

(72) Inventor: Andres Quinta Cortinas, Pontevedra (ES)

( * ) Notice: Subject to any disclaimer, the term of this patent is extended or adjusted under 35 U.S.C. 154(b) by 0 days.

(21) Appl. No.: 16/956,399

(22) PCT Filed: Dec. 19, 2018

(86) PCT No.: PCT/ES2018/070816
§ 371 (c)(1),
(2) Date: Jun. 19, 2020

(87) PCT Pub. No.: WO2019/122483
PCT Pub. Date: Jun. 27, 2019

(65) Prior Publication Data
US 2020/0359607 A1    Nov. 19, 2020

(30) Foreign Application Priority Data

Dec. 22, 2017    (ES) .............................. ES201731454

(51) Int. Cl.
*A01K 61/54*    (2017.01)
*A01K 61/73*    (2017.01)
*A01K 61/80*    (2017.01)

(52) U.S. Cl.
CPC .............. *A01K 61/54* (2017.01); *A01K 61/73* (2017.01); *A01K 61/80* (2017.01)

(58) Field of Classification Search
CPC ........ A01K 61/54; A01K 61/55; A01K 61/60; A01K 61/65; A01K 61/73; A01K 61/78; A01K 61/80

(Continued)

(56) References Cited

U.S. PATENT DOCUMENTS 2,989,945 A      6/1961   Ford
3,109,183 A  *  11/1963   Overmyer ............... B63B 35/58
                                                   441/46

(Continued)

FOREIGN PATENT DOCUMENTS

CA         117383 S        4/2008
EP         1466524 A1  * 10/2004   ............. A01K 61/54

(Continued)

OTHER PUBLICATIONS

International Search Report for PCT/ES2018/070816 Prepared by the Spanish Patent Office dated Apr. 29, 2019, 6 pages with English Translation.

*Primary Examiner* — Brady W Frazier
*Assistant Examiner* — Madison Elizabeth Dittner
(74) *Attorney, Agent, or Firm* — Breiner & Breiner, L.L.C.

(57) ABSTRACT

A system of fattening for molluscs having supporting frames with first coupling members for the uprights that make up components and, carriers of the breeding compartments, and second coupling members on the flotation tubes of a moveable platform. The members and the uprights have aligned openings and that are actuated by removable coupling devices allowing the uprights to be attached or uncoupled. A crossbar, with an arrangement of connectors, keeps the components and provides an easily handled module that can be separated from the supporting frame along with the breeding compartments.

5 Claims, 4 Drawing Sheets

(58) Field of Classification Search
USPC ........ 119/234, 236, 238, 239, 240, 241, 242
See application file for complete search history.

(56) References Cited

U.S. PATENT DOCUMENTS

| | | | | |
|---|---|---|---|---|
| 3,708,982 | A * | 1/1973 | Blockwick | E02B 15/0885 405/70 |
| 3,766,888 | A * | 10/1973 | Wiegardt, Jr. | A01K 61/54 119/240 |
| 4,061,110 | A * | 12/1977 | Steidle | A01K 61/54 119/241 |
| 4,195,436 | A * | 4/1980 | Moure | A01K 69/08 43/100 |
| 4,266,509 | A * | 5/1981 | Gollott | A01K 61/54 119/208 |
| 5,628,280 | A | 5/1997 | Ericsson | |
| 6,544,560 | B1 * | 4/2003 | Bullent | A01K 61/54 424/520 |
| 7,661,390 | B2 * | 2/2010 | Mortensen | A01K 61/59 119/240 |
| 8,033,250 | B2 * | 10/2011 | Calinski | A01K 61/60 119/208 |
| 8,240,080 | B1 * | 8/2012 | Lueck | A01K 97/05 43/55 |
| 8,920,061 | B2 * | 12/2014 | Quinta Cortinas | B63B 3/08 403/220 |
| 9,980,469 | B2 * | 5/2018 | Brosh | A01K 61/00 |
| 10,709,117 | B2 * | 7/2020 | Perslow | A01K 63/065 |
| 2001/0029694 | A1 * | 10/2001 | Bodden | A01K 61/70 43/102 |
| 2007/0068462 | A1 | 3/2007 | de Vries et al. | |
| 2015/0144068 | A1 * | 5/2015 | Quinta Cortinas | B63B 3/04 119/223 |

FOREIGN PATENT DOCUMENTS

| | | | | |
|---|---|---|---|---|
| EP | 1852015 | A1 * | 11/2007 | ............ A01K 61/54 |
| EP | 1852015 | A1 | 11/2007 | |
| ES | 2315701 | T3 | 4/2009 | |
| ES | 2377284 | A | 2/2013 | |
| FR | 2649293 | A1 | 1/1991 | |
| JP | 2012223151 | A * | 11/2012 | ............ Y02A 40/81 |
| JP | 6279147 | B2 * | 2/2018 | ............ B63B 35/34 |
| KR | 100668441 | B1 * | 1/2007 | ............ A01K 61/70 |
| WO | 9937141 | A1 | 7/1999 | |
| WO | 10139833 | A1 | 12/2010 | |
| WO | 11141608 | A1 | 11/2011 | |
| WO | 13168147 | A1 | 11/2013 | |

\* cited by examiner

SYSTEM FOR FATTENING MOLLUSCS

CROSS-REFERENCE TO RELATED APPLICATION

This application is the U.S. national phase of PCT Application No. PCT/ES2018/070816 filed on Dec. 19, 2018, which claims priority to ES Patent Application No. P201731454 filed on Dec. 22, 2017, the disclosures of which are incorporated in their entirety by reference herein.

TECHNICAL FIELD

The invention provides a system conceived, in particular for but not exclusively for, the fattening of molluscs. The system is based on the transfer of developing molluscs, previously introduced into fattening compartments, carried on a supporting frame. The supporting frame is either placed on a moveable platform, or connected to navigable platforms that can be submerged and raised to the surface, supporting frame or connected to vertically sliding platforms on fixed piles close to the coastline, in such a way that the whole structure can move or be moved, or kept underwater at the required level and depth to ensure the optimum use of the feed resources by the particular species being cultivated during its growth phase. The system could be used for the recovery of endangered species by introducing them into clean marine habitats with suitable conditions of salinity.

BACKGROUND TO THE INVENTION

It is well-known that the transformation of a wild oyster egg into an edible adult takes three to five years. When this natural process is induced the time taken for this growth and maturing of an oyster into a marketable size can be shortened by half or even less, although it requires some arduous work in terms of selection, cleaning and handling, almost always by hand.

The use of anchored structures that carry compartments for the fattening of the species being cultivated is very usual in marine aquaculture so that young molluscs can take advantage of the surrounding marine environment, especially the nutrients and water salinity. Document U.S. Pat. No. 2,989,945 serves as a general example, such structures are placed on the chosen seabed, anchored with deadweights, marked by buoys and when it is thought that sufficient fattening time has passed for the species in question, they are raised from the seabed using cranes, winches or other similar devices and brought to the surface for collection. More recently, documents FR 2649293 and U.S. Pat. No. 5,628,280 show concrete bases with columns to support a wide-variety of structures that carry breeding compartments, aligned horizontally and superimposed at various vertical levels.

These conventional installations require analytical studies beforehand and the data in question must be carefully weighed up and considered to calculate their optimum location in the sea. As these installations must be maintained over a long period of time the proposed location should avoid creating extra work or problems for the producer. Moreover, transport, towing, ballast, erection of signs and relocation are all necessary, which in some cases makes the installation of the system impossible. In addition, access to the harvesting of the production and the manipulation of the compartments and structures that house them is complicated and labour intensive.

OBJECT OF THE INVENTION

The invention aims to create a system that accelerates the growth and development of molluscs in open waters. The system has the goal of optimizing the use of the successive habitats that can be occupied by the compartments containing the growing molluscs when they are located on moveable platforms to ensure adequate nutrition and improve the salty taste of the growing species; whether they are loaded onto sliding platforms and vertically guided when raised/lowered along piles or along vertical guides fixed on the seabed close to the shoreline, or when they are placed on navigable platforms that can be raised/lowered by pneumatic means until they reach marketable size. The system can also be used in the recovery of endangered species by introducing them into clean marine habitats and suitable saline conditions. Other aims and advantages of the invention will be explained below.

DESCRIPTION OF THE INVENTION

This system of fattening for molluscs in open waters includes a wide-range of components that carry the compartments containing molluscs and that are fixed to a supporting frame that can be incorporated onto a moveable platform. It could be arranged, for example, on a vertically guided platform between piles fixed to the seabed, or a navigable platform that includes a means of flotation allowing it to rise/submerge, which, when required, has a means of propulsion. In all their movements and displacements, the compartments accompany the movable platforms that support them, therefore they can be taken to different depth levels and raised to the surface for harvesting or maintenance work. The system ensures the continuous renewal of the water surrounding them, bringing an improvement in the oxygenation and increasing the amount of nutrients around them, contributing to accelerate the growth of the molluscs without damaging the habitat. The system allows an appropriate number of components and compartments to be placed on the supporting frame according to the environmental conditions.

The components that carry the compartments containing the molluscs include uprights, generally made of extruded metal, polymers or other thermoplastic materials. Each component carrying the compartments is made up of a pair of uprights. The uprights in each pair are longitudinally spaced, at a distance that is in general lower than the length of the compartment being held. The carrying components, and therefore the uprights, are aligned longitudinally, at a certain distance from each other and connected by a bar on the upper side, usually a tubular extrusion. This defines a module that can be independently handled and separated from the supporting frame that keeps them on the moveable platform. To improve handling, several modules can be connected on the upper side by bars with connectors to create a modular set and the whole assembly can be reinforced using struts.

A large number of brackets are arranged between each pair of uprights, separated vertically and aligned. The brackets are preferably counterbalanced on both sides of a pair of uprights and at an angle, preferably between 30°-45° so as to aid the flow of water through them and ensure feeding. Removable, water-permeable rearing compartments preferably trays with a lid and base and made of a metallic mesh to protect the specimens from predators and suitably reinforced with metallic inserts, are put on the brackets. Supporting braces help to strengthen the brackets. The molluscs are put in the compartments inside a flexible container made of netting with a simple closing system to promote oxygenation, feeding and growth. The netting is of different sizes according to the size of the species being reared. The preferred setup is a compartment with ledges so that any displacement of the specimens is avoided.

The supporting frame of the components carrying the compartments for the molluscs is made of, in the simplest preferred version, a tubular extrusion of square-section aluminium that is normally held horizontally between two flotation tubes in parallel to the moveable platform. The structure has an upper face connected to the first coupling members, preferably by welding, made of short tubes with a suitable distance between them which have openings for coupling that are designed so that they can be crossed by removable coupling devices that also cross the respective openings for coupling on the lower sections of the uprights, so that the retention of the components in the structure is assured. On the lower reverse side, the structure has some second coupling members, made by roto-moulding, with an open face that can be fitted onto the edge of a floater tube on the moveable platform. In its simplest form, there are two coupling members, at some distance to each other and located towards the ends of the structure so that they can be fitted to the edges of the floater tubes that are parallel to and close to the moveable platform.

The moveable platform, for example, is preferably made of a tubular framework consisting of tubes made from materials that withstand bad weather conditions, such as high-density polyethylene, although the use of other plastic polymers or metals and metal alloys, such as stainless steel cannot be ruled out. All or a part of the tubes on the platform are partitioned and have a system of valves that allow the selective emptying and filling of the compartments, for lowering/raising. A remote-control system is obviously included. When the system is navigable, the platform is constructed with means of control: rudders for steering, stabilizers, signalling, lateral mooring reinforcements and other elements typical on this type of platforms. Furthermore, it is obvious that remote control systems are included to monitor the structure.

Given that, to a large extent, the system will be used close to the shoreline and that at times it must be protected from storms, a protecting barrier is incorporated, This is anchored in front of the supporting platform at a suitable distance from it, with the aim of keeping species harmful to the molluscs at a suitable distance or to avoid their presence completely. Although the protecting barrier can be chosen from among conventional barriers, for example tyres, they are preferably made of tubes, usually polyethylene and with ballast.

BRIEF DESCRIPTION OF THE DRAWINGS

One example of embodiment of a system for fattening of molluscs, but not limited to this, is shown in the accompanying drawings, in which.

PREFERRED EMBODIMENT OF THE INVENTION

Figure 1:
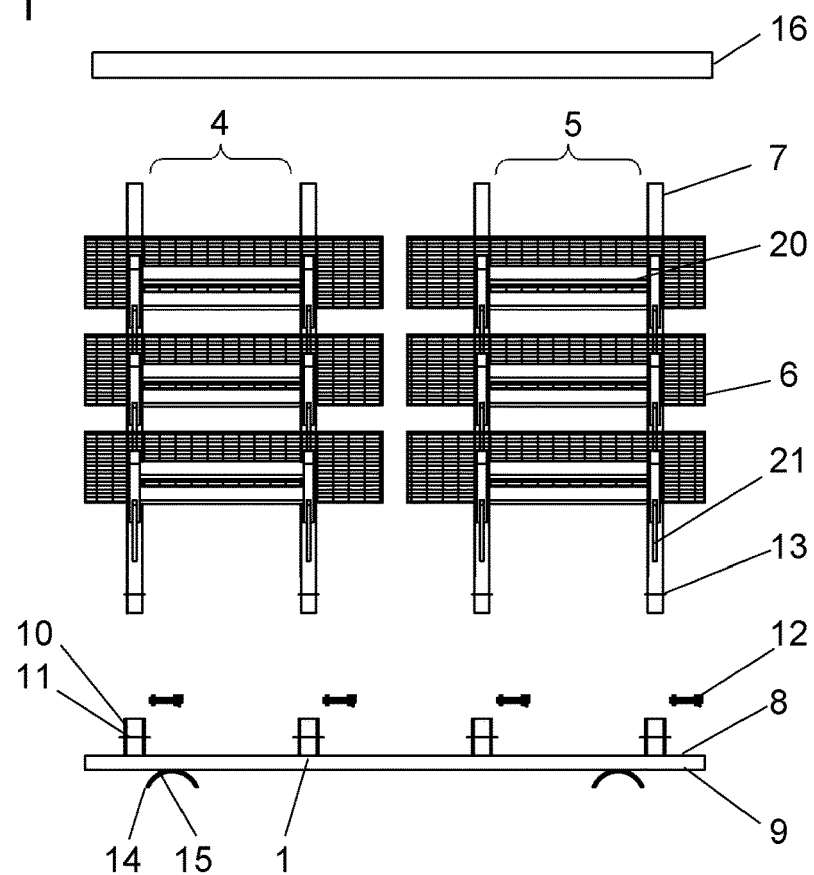
FIG. 1 is a schematic view of the front elevation illustrating the detail of a module in the system, with its components separated just before being coupled to the supporting frame.
Figure 2:
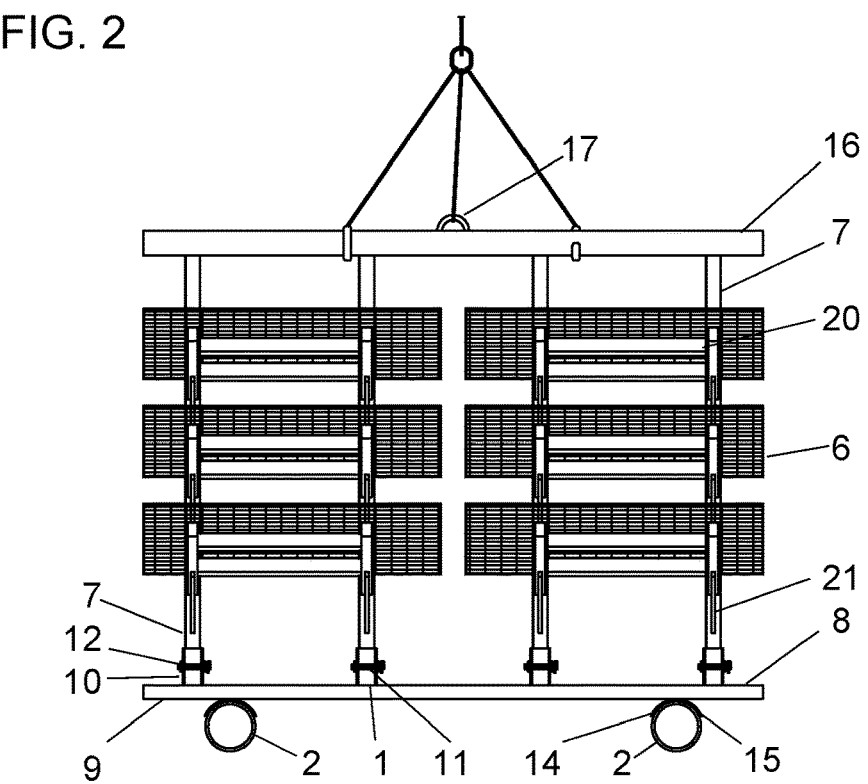
FIG. 2 is a front elevation corresponding to FIG. 1 and illustrates the module with its components assembled and a conventional attaching arrangement added to the upper upright and the module placed between two floater tubes of a platform.

With respect to the figures mentioned above, the fattening system is made up of a supporting frame (1) designed to be coupled between the two flotation tubes (2) of a platform (3) and each one, to carry, first (4) and second (5) components that carry the breeding compartments (6).

The supporting frame (1) is made from square-section extruded tubular aluminium bars that are in general laid out horizontally between two flotation tubes (2) parallel to the platform (3) which provide an upper face (8) in addition to a lower and reverse face (9). The upper face (8) has, vertical and spaced, first (10) tubular coupling members, these have diametrically facing openings for attachment (11) on their edge suitable for receiving removable coupling devices (12), such as conventional pins, which also cross respective openings for coupling (13) placed on the lower sections of the uprights (7), with the aim of assuring that the components (4) and (5) are anchored to the structure (1). The supporting frame (1) has second coupling members (14) on its lower side (9) and close to the ends, preferably obtained via roto-moulding, as is illustrated in the figures, each one with a lower face (15) open at the same point on the upper edge of the flotation tubes (2) of the platform (3).

Each component (4) and (5) that carries the compartments (6) is made from a pair of uprights (7), usually of extruded aluminium placed vertically and separated longitudinally at a distance that is preferably less than the length of the compartment (6) to be held. The components (4) and (5) and, with these, the uprights (7) are longitudinally aligned, spaced and connected on the upper side by a crossbar (16), usually extruded aluminium and normally with a hooking arrangement (17), defining a module (18) that can be independently handled and separated from the supporting frame (1) and that keeps them on the flotation tubes (2) of the platform (3). A large number of brackets (20) are arranged, connected between each pair of uprights (7), vertically spaced and aligned.

Figure 3:
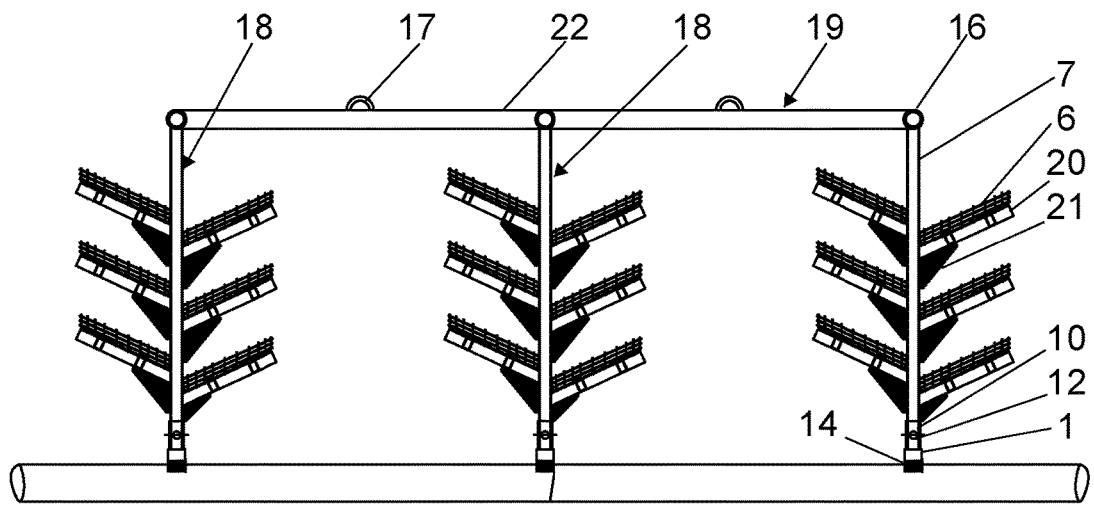
FIG. 3 is a profile view, corresponding to FIG. 1, showing several modules connected on the upper side by crossbars with hooks and the modular set incorporated onto the platform floater tubes.
Figure 4:
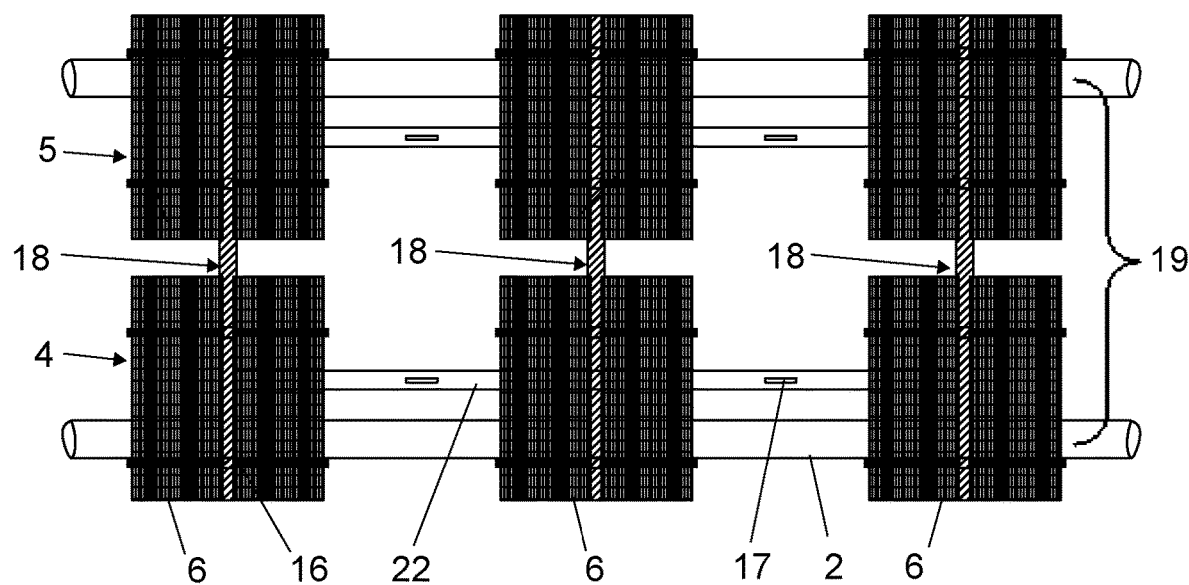
FIG. 4 is a plan view, corresponding to FIG. 3.

As can be seen in FIGS. 3 and 4, the brackets (20) are counterbalanced on both sides of the pair of uprights (7) and placed at an angle of between 30°-45°, which aids the flow of water and nutrients through them. The breeding compartments (6), are usually made from metallic mesh and can be seen over the brackets (20).

Supporting braces (21) are located on the uprights (7) and situated under the brackets (20) to help withstand the growing weight of the molluscs.

Figure 5:
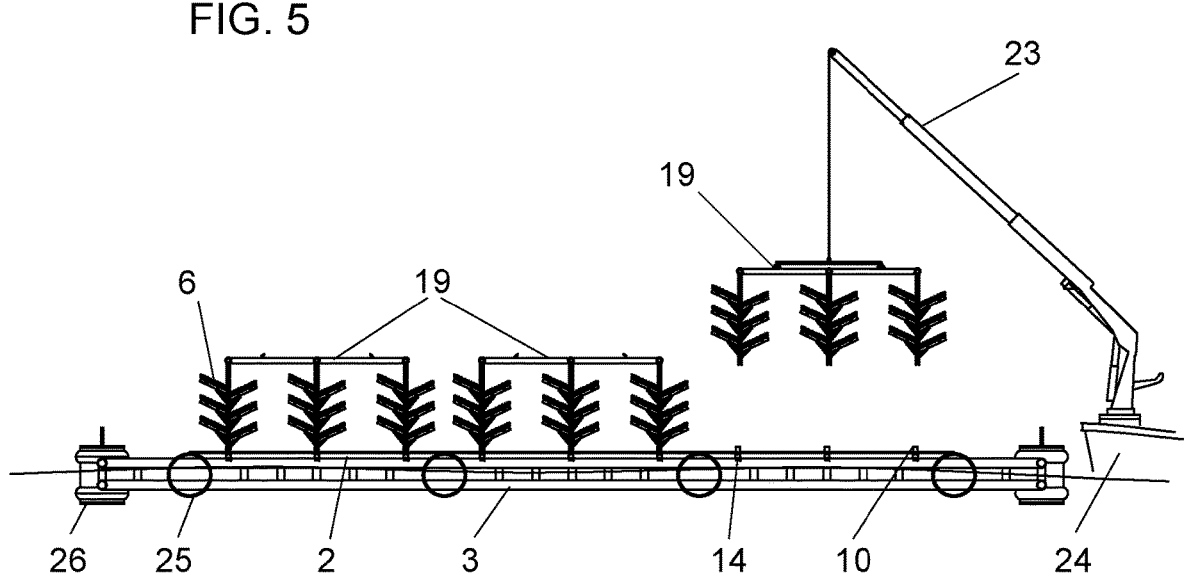
FIG. 5 is a profile view, at a smaller scale than previous ones, showing the general setup of the proposed fattening system and illustrates an operating position where the unit made up of several modules, or modular set, is being removed from the moveable platform, designed as a navigable installation in this preferred setup.
Figure 6:
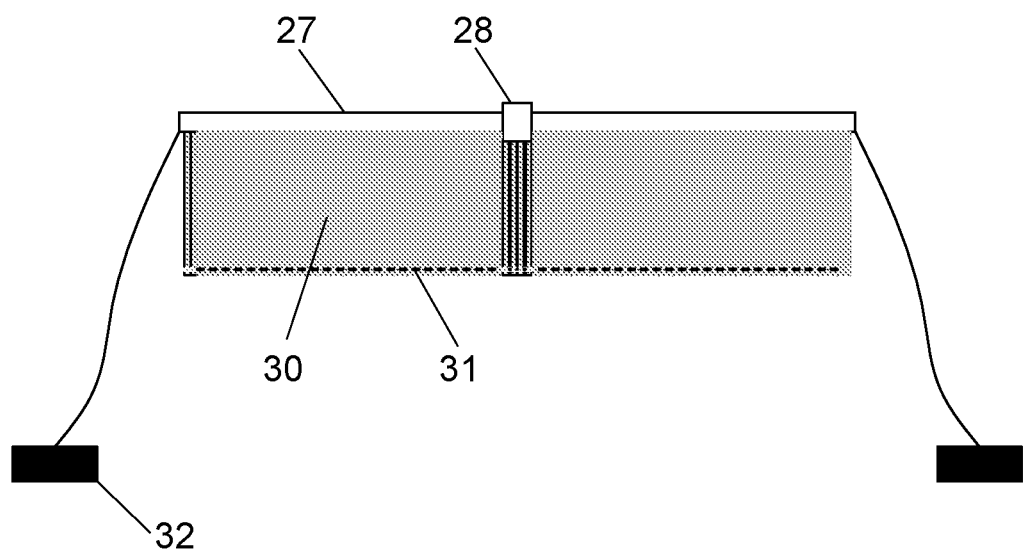
FIG. 6 is a schematic front elevation of a protecting barrier, at a smaller scale, of the system in a working position.
Figure 7:
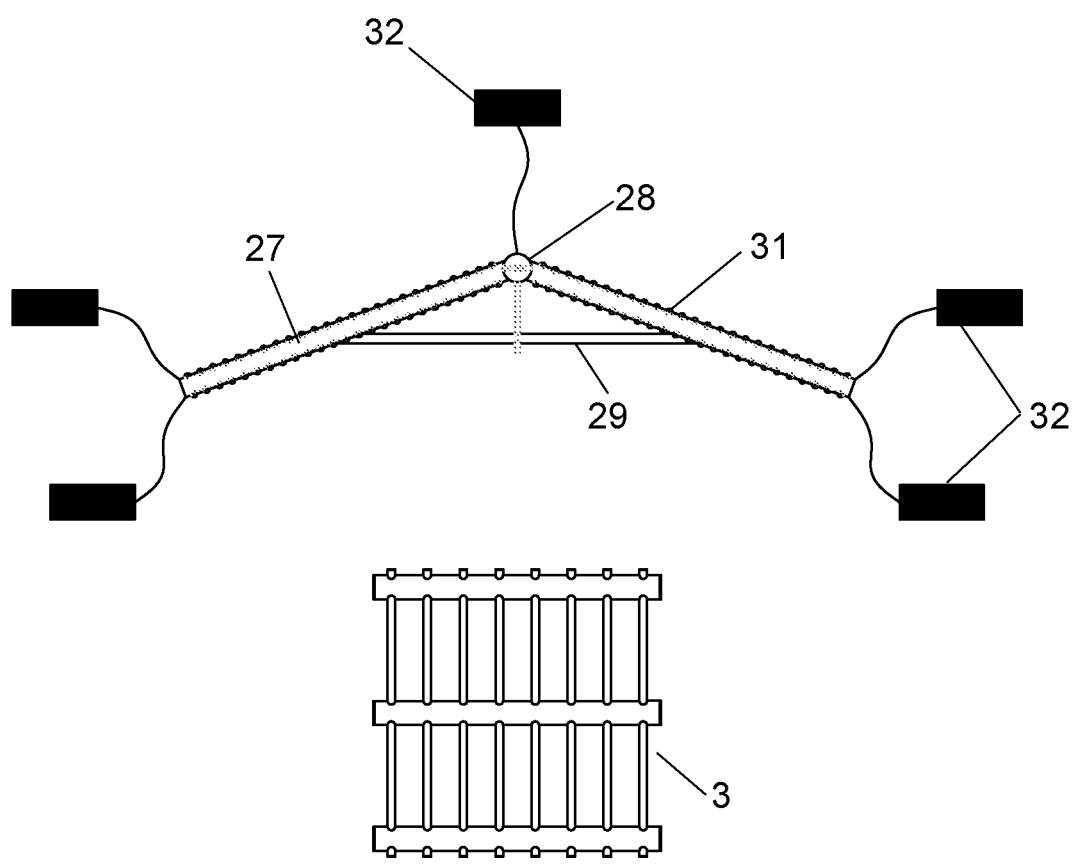
FIG. 7 is a schematic plan illustrating a protecting barrier, at a smaller scale, of the system at a distance from the moveable platform.

Several modules (18) with rearing compartments (6) are shown in FIGS. 1 to 4, it can be observed that on the corresponding supporting frame (1) a modular set (19) is created connected to the flotation tubes (2) of the platform (3), this includes crossbars (22) with hooks (17), best illustrated in FIGS. 3 and 4, for handling as is shown schematically in FIG. 5, where the separation of one of the modular sets (19) can also be seen with the help of a crane (23) located on the auxiliary vessel (24), once the devices (12) have been extracted from the openings for coupling (11) on the first coupling members (10) and from the openings for coupling (13) on the uprights (7).

In the proposed example, the platform (3) as well as the flotation tubes (2), are constructed with floater tubes (25) that have a larger diameter and incorporate vertical floaters (26) on the corners, in addition to the lateral moorings and walkways (not illustrated).

The protecting barrier is constructed with a flotation unit that has two horizontally placed tubes (27) which, at their point of connection there is an end joint at the edge of the vertical tube (28) of larger diameter, forming an angle of 140° but whose size can vary, but which can be maintained with the help of a crossbar (29). From each one of the tubes (27) hang a row of small diameter tubes (30) joined to each other at the lower part via a covered chain (31). The tubes (27), (28), (29) and (30) are preferably made from high-density extruded polyethylene. When in use the barrier is anchored with the aid of dead-weights (32) around 15 or 20 metres from the supporting frame.

The invention has been described according to the illustrated embodiment. Obviously, it is possible to include other details that modify it and/or replace certain elements or arrangements with others that are similar or to add complementary now known devices, without them affecting the essential concept of the invention.

The invention claimed is:

1. A system of fattening for molluscs, for use in marine environments, comprising: a plurality of separate portable modules releasably connectable to a platform, wherein a module of said plurality of separate portable modules comprises a first component and a second component carrying breeding compartments;

a supporting frame for the first component and the second component, each of the first component and the second component comprising a pair of longitudinally spaced uprights between which are located brackets that carry the breeding compartments; and a single crossbar connecting the first component and the second component, which are aligned longitudinally, and by the upper ends of respective uprights of said first component and said second component;

wherein the supporting frame is located substantially horizontally above two flotation tubes of the platform, the supporting frame having an upper section having first coupling members spaced longitudinally thereon to receive the uprights and a lower section with second coupling members constructed with a lower face fitted to an upper edge of the flotation tubes on said platform;

wherein said first coupling members and said uprights have respective and corresponding openings for coupling, designed to receive a removable coupling device that is applied horizontally to connect the first coupling members and said uprights in such a way that said first component and said second component can be maintained or separated with respect to the supporting frame and consequently the platform.

2. The system of fattening for molluscs, according to claim 1, wherein the module further comprises hooks to aid separation of the module from the supporting frame.

3. The system of fattening for molluscs, according to claim 1, wherein two or more of the plurality of separate portable modules are connected on to the upper section by at least one crossbar with connectors creating a modular set that can be handled by a lifting device.

4. The system of fattening for molluscs, according to claim 1, wherein the brackets are counterbalanced on each side of a pair of uprights, aligned vertically and orientated at angles that are between 30°-45° to the horizontal.

5. The system of fattening for molluscs, for use in marine environments, of claim 1, wherein the platform further comprises horizontal tubes placed about a periphery of the platform having a plurality of small diameter tubes hanging therefrom interconnected by a weighted chain forming a protective barrier.

* * * * *